United States Patent
Takahashi et al.

(10) Patent No.: US 12,481,657 B2
(45) Date of Patent: *Nov. 25, 2025

(54) DYNAMIC DATA WAREHOUSE COMPUTATIONAL OFFLOADING IN DIRECTED ACYCLIC GRAPH-DRIVEN NOTEBOOK ENVIRONMENT

(71) Applicant: Hex Technologies, Inc., San Francisco, CA (US)

(72) Inventors: Glen Takahashi, San Jose, CA (US); Adam Joseph Storr, San Francisco, CA (US); Caitlin Royden Colgrove, San Francisco, CA (US); Barry Ryan McCardel, San Francisco, CA (US)

(73) Assignee: Hex Technologies Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,239

(22) Filed: Jun. 1, 2024

(65) Prior Publication Data
US 2024/0346023 A1    Oct. 17, 2024

Related U.S. Application Data

(63) Continuation of application No. 18/299,682, filed on Apr. 12, 2023, now Pat. No. 12,045,239.

(51) Int. Cl.
*G06F 16/24*     (2019.01)
*G06F 16/2455*   (2019.01)
*G06F 16/26*     (2019.01)

(52) U.S. Cl.
CPC .......... *G06F 16/2455* (2019.01); *G06F 16/26* (2019.01)

(58) Field of Classification Search
CPC ............................ G06F 16/2455; G06F 16/26
USPC ......................................................... 707/603
See application file for complete search history.

(56) References Cited

U.S. PATENT DOCUMENTS

| 6,763,458 B1 * | 7/2004 | Watanabe ............. H04L 69/329 713/100 |
| 11,263,268 B1 | 3/2022 | Bourbie et al. |
| 2006/0158459 A1 * | 7/2006 | Ferguson ................ G06F 9/451 345/619 |

(Continued)

OTHER PUBLICATIONS

PCT International Search Report and Written Opinion, PCT Application No. PCT/US23/25454, Sep. 21, 2023, 15 pages.

*Primary Examiner* — Hanh B Thai
(74) *Attorney, Agent, or Firm* — Fenwick & West LLP

(57) ABSTRACT

A device detects a trigger to toggle from a local mode to a query mode, the trigger detected based on input into a notebook interface relating to a dataframe. The device receives input of a query into a cell within the notebook interface, the query relating to the dataframe, and determines, based on having entered the query mode, to combine the query with a prior query from a prior cell within the notebook interface, resulting in generation of an combined query. The device executes the combined query with respect to a data warehouse, receives a command to perform a function with respect to the combined query, and determines, based on characteristics of the command, to execute the command using memory of the notebook interface. The device outputs, using the notebook interface, a graphical representation of results of the command, the results informed by the combined query.

20 Claims, 9 Drawing Sheets

(56) References Cited

U.S. PATENT DOCUMENTS

| | | | | |
|---|---|---|---|---|
| 2006/0287983 | A1* | 12/2006 | Krauss | G06F 16/90335 707/E17.14 |
| 2013/0218912 | A1* | 8/2013 | Howard | G06Q 30/0633 707/769 |
| 2014/0006411 | A1* | 1/2014 | Boldyrev | G06F 16/2455 707/741 |
| 2015/0186406 | A1* | 7/2015 | Nadimi | G06Q 50/01 707/610 |
| 2015/0356147 | A1* | 12/2015 | Mishra | G06F 16/2365 707/693 |
| 2018/0218046 | A1* | 8/2018 | Woo | G06F 16/24564 |
| 2019/0102436 | A1* | 4/2019 | Bishnoi | G06F 16/244 |
| 2020/0007615 | A1* | 1/2020 | Brebner | G06F 9/542 |
| 2020/0285788 | A1* | 9/2020 | Brebner | G06F 18/251 |
| 2022/0138266 | A1* | 5/2022 | Wang | G06N 3/044 707/722 |
| 2022/0382779 | A1* | 12/2022 | Ogievetsky | G06F 16/287 |
| 2023/0100289 | A1* | 3/2023 | Kare | G06F 16/252 707/702 |
| 2023/0245080 | A1* | 8/2023 | Anderson | G06Q 20/3825 705/75 |

* cited by examiner

900

902 Detect a trigger to toggle from a local mode to a query mode, the trigger detected based on input into a notebook interface relating to a dataframe

904 Receive input of a query into a cell within the notebook interface, the query relating to the dataframe

906 Determine, based on having entered the query mode, to combine the query with a prior query from a prior cell within the notebook interface, resulting in generation of a combined query

908 Execute the combined query with respect to a data warehouse

910 Receive a command to perform a function with respect to the combined query

912 Determine, based on characteristics of the command, to execute the command using memory of the notebook interface

914 Output, using the notebook interface, a graphical representation of results of the command, the results informed by the combined query

*FIG. 9*

DYNAMIC DATA WAREHOUSE COMPUTATIONAL OFFLOADING IN DIRECTED ACYCLIC GRAPH-DRIVEN NOTEBOOK ENVIRONMENT

CROSS REFERENCE TO RELATED APPLICATIONS

This application is a continuation of co-pending U.S. application Ser. No. 18/299,682, filed Apr. 12, 2023, which is incorporated by reference in its entirety.

TECHNICAL FIELD

The disclosure generally relates to the field of cell-driven notebook generation, and more specifically relates to operating a query mode to offload computational complexity from memory to a data warehouse tuned to perform complex computation for queries within a directed acyclic graph (DAG) cell environment.

BACKGROUND

In a notebook environment, users may generate interdependent cells for any number of purposes. The cells may operate using different programming languages or schema, and may perform functions based on activity that occurs in other cells. Some cells are implemented using programming languages tuned to executing within provisioned kernel memory to compute function results (e.g., python cells), while others are tuned to query external resources (e.g., SQL (Structured Query Language) cells). Where a user attempts, using a notebook environment, to run a function on a large dataframe (e.g., one billion rows), and the user does not have sufficient memory to run the function, the operation will fail. The user's recourse in such scenarios is to break down the function into many sub-functions and to call the relevant data stores many times, thus resulting in waste of network bandwidth in making redundant communications, as well as inefficient use of computational resources in performing many sliced tasks instead of dispensing of the task in one attempt.

SUMMARY

Systems and methods are disclosed herein for toggling into a query mode based on a trigger. When in query mode, when a user generates a new cell that relates to performing a function on a dataframe, the system automatically converts the function into a database query language. The system traverses a graph structure (e.g., a DAG graph indicating relationships between cells in a notebook) to identify other cells containing data relating to the function (e.g., a prior query relating to the data frame and the results therefrom), and may combine the cell data into the converted database query language. For example, a user enters query mode and then calls a dataframe called "flights" that stores data for hundreds of thousands of flights. Because the user is in query mode, rather than load the dataframe to memory (which may fail due to its size), the system translates the command into a query to the data in the underlying database. Optionally, a preview (e.g., the first 100 rows) of the flights dataframe may be shown, where the dataframe at large is not loaded to memory. When the user then queries for flights having at least 100 passengers, the system may combine that query with the earlier query for the flights database to leverage the prior results. When the user next queries for flights having less than 300 passengers, the system may again combine this query with the earlier query to now return results from 100 to 300 passengers from the dataframe.

In this way, the user may continually pivot and filter across a dataframe without loading the data frame to memory until the user is satisfied to perform a function on a satisfactory query result (e.g., build a chart on the 100 most relevant flights). This yields an optimal scenario where computationally expensive functions to be performed in the kernel are instead offloaded to data warehouses optimized to perform those queries, whereas functions that are optimal to be performed in the kernel using the notebook memory (e.g., optimal python functions) are performed in the kernel.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 9 is an exemplary flowchart for running cells in a query mode of a notebook tool, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
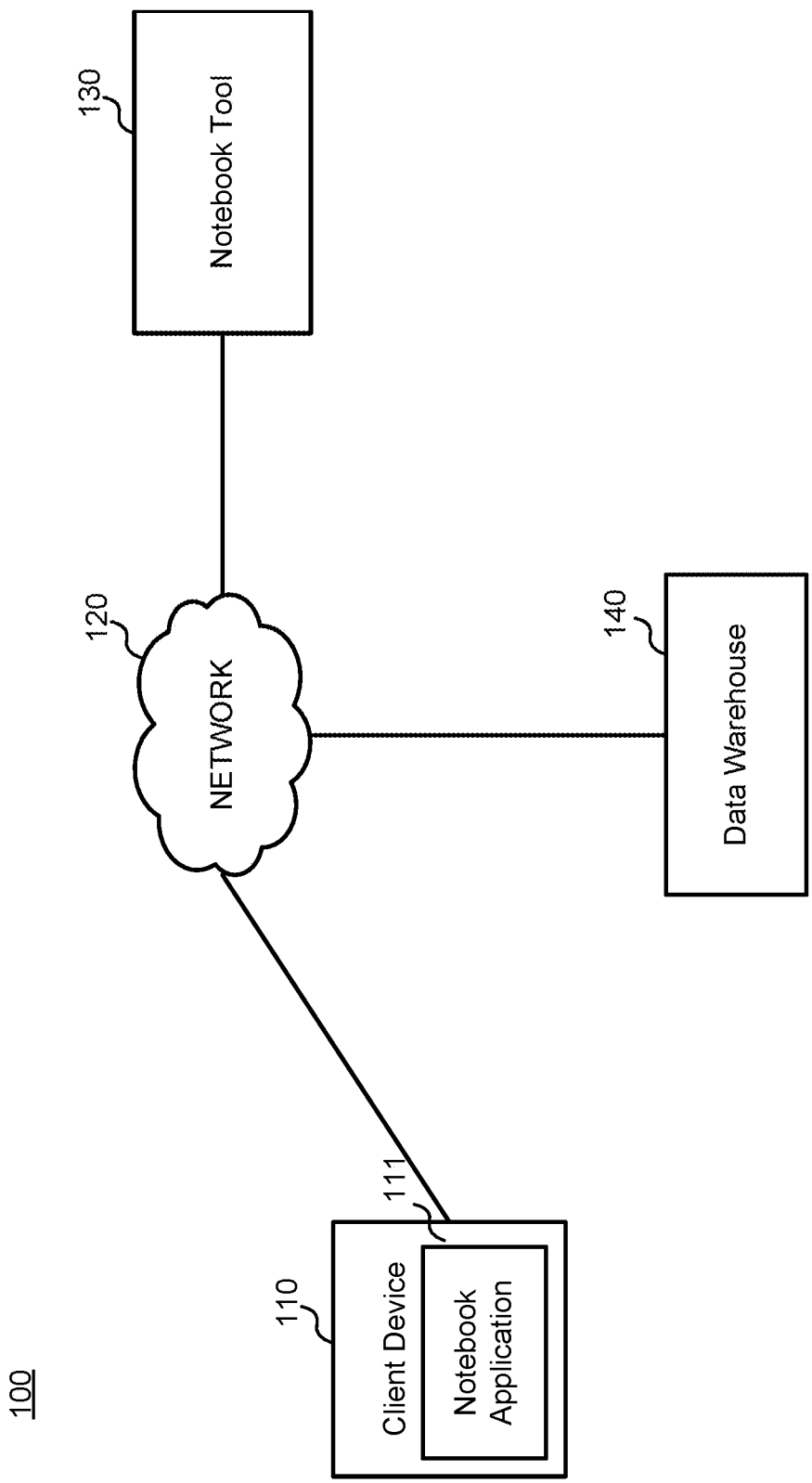
FIG. 1 illustrates one embodiment of a system environment for implementing a notebook tool.

FIG. 1 illustrates one embodiment of a system environment for implementing a notebook tool. As depicted in FIG. 1, environment 100 includes client device 110 with notebook application 111 installed thereon, network 120, notebook tool 130, and data warehouse 140. Client device 110 may be any device having a user interface usable to interact with a notebook via notebook application 111 and/or notebook tool 130. Exemplary client devices may include personal computers, laptops, tablets, smartphones, and so on. While only one client device 110 is depicted, any number of client devices may be used. Multiple client devices may be used at a same time to access and otherwise collaborate on a same notebook.

Notebook application 111 may be a dedicated application installed on client device 110 for using a notebook. Notebook application 111 may be installed directly or indirectly from notebook tool 130 (e.g., downloaded from notebook tool 130; downloaded from an application store; from a hard drive having installation code, and so on). The notebook may in whole or in part be stored in the cloud (e.g., using notebook tool 130) and/or local to client device 110. Notebook application 111 may be a browser through which a notebook may be accessed from notebook tool 130. The term notebook, as used herein, may refer to an application that accepts inputs in any number of code languages (e.g., Python, SQL (Structured Query Language), and so on) and/or non-code languages (e.g., spreadsheet format, text format, etc.). The inputs may each form individual cells, or may command combinations of inputs that together form cells. Cells may be connected in a DAG structure, with directed edges pointing between one another that reflect dependencies among cells. The DAG structure and further details about notebook operation are discussed in further detail with reference to FIGS. 2-6. References to activity performed by notebook application 111 are merely exemplary, and that same functionality may, wherever notebook application 111 is referred to, be performed in whole or in part by notebook tool 130. That is, activity described herein as performed by notebook application 111 may be performed on-device, on-cloud (using notebook tool 130), or may be distributed with partial performance by each entity.

Network 120 may be a data communication channel between client device 110, notebook tool 130, and data warehouse 140. The data communication channel may be any channel usable to transmit communications between these entities, such as the Internet, a local area network, a wireless network, a short-range communications network, and so on. Network 120 may facilitate communication between any number of client devices and external servers and services beyond those depicted in environment 100.

Notebook tool 130 may be a cloud-based provider that stores notebooks and provides functionality described herein with respect to notebooks. All functionality described herein with respect to notebook application 111 may be performed by notebook tool 130, and all functionality described herein with respect to notebook tool 130 may be performed by notebook application 111 in part or in whole. Distributed processing where some activity described is performed by notebook 111 and other activity described is performed by notebook tool 130 is implied as within the scope of what is described even where processing is only described with respect to one of the two entities herein. Further details about the functionality of notebook tool 130 are described below with respect to FIG. 2.

Data warehouse 140 is depicted as one data warehouse and is recited in the singular, but may include any number of data warehouses provided by any number of providers, which may use their own schema in storing and querying data. Notebook application 111 may be provisioned with a data connector that translates commands from a schema used by notebook application 111 to be compatible with data warehouse 140. Each respective data connector may support and translate bidirectional communications between notebook application 111 and a respective data warehouse 140. Notebook application 111 may use dedicated memory (e.g., memory of client device 110 and/or cloud memory provisioned by notebook tool 130) for local functions, such as processing python script. Notebook application 111 may use memory of data warehouse for remote functions such as data queries and data synthesis. Further details about optimally splitting workloads between notebook application 111 and data warehouse 140 is discussed in further detail below.

Figure 2:
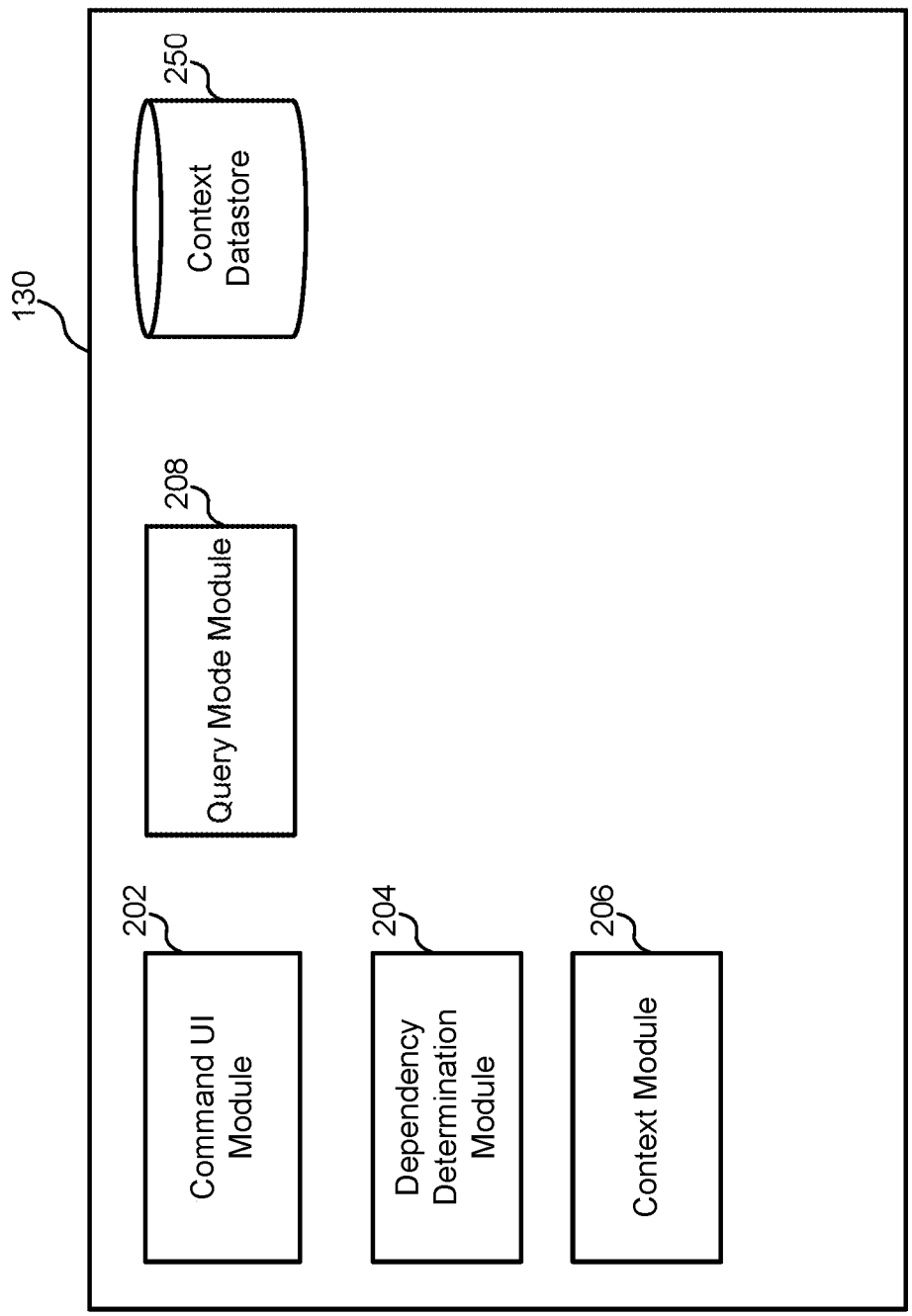
FIG. 2 illustrates one embodiment of modules of the notebook tool.

FIG. 2 illustrates one embodiment of modules of the notebook tool. As depicted, notebook tool 130 includes command UI (user interface) module 202, dependency determination module 204, context module 206, query mode module 208, and context datastore 250. The modules and datastores depicted in FIG. 2 are merely exemplary; any number of modules and/or datastores may be used to achieve the functionality disclosed herein. Moreover, as mentioned above, while the modules and datastore are illustrated and described with respect to notebook tool 130, some or all of the operation of these modules and/or datastores may part of notebook application 111 operating on client device 110, thus accommodating on-device operation in whole, or distributed processing between notebook application 111 and notebook tool 130.

Figure 3:
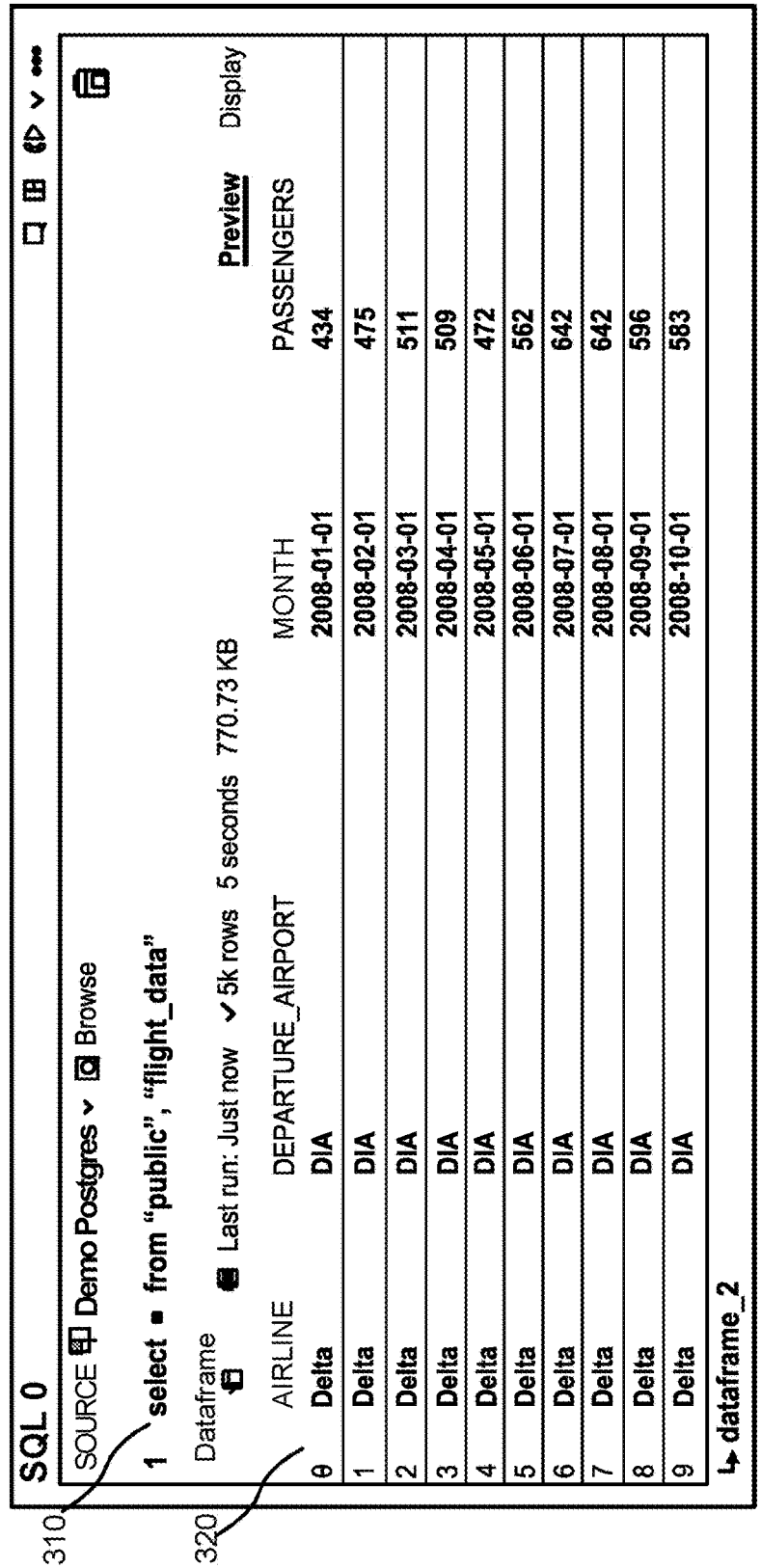
FIG. 3 illustrates an exemplary user interface for generating and running a cell, in accordance with an embodiment.

Command UI module 202 receives inputs in cells of a notebook. Turning for the moment to FIG. 3, FIG. 3 illustrates an exemplary user interface for generating a cell, in accordance with an embodiment. User interface 300 may include multiple cells each having their own interface, where different cells may be used to generate code versus generating markdown (e.g., tables, text, etc.) versus generating SQ and so on. These are merely exemplary; any number of cells may be generated or part of user interface 300, and the cells may use any language (other code languages like Python, natural language, spreadsheet, or any other language is within the scope of the disclosure). As depicted, user interface 300 shows a selection of a source of "Demo Postgres", which is a data warehouse of data warehouse 140. Interface 310 accepts input in a native language to notebook application 111, such as python, to perform a command. The command in this case is to select all rows of public flight information from a dataframe called flight_data. Interface 320 may preview or do a full display of the results of the command being executed.

Cells may be generated from scratch or may be generated using pre-existing components. To use pre-existing components, user interface 300 may display a selectable component option (not depicted), which may lead to a library of components. A user may select from the library a component, and responsive to doing so, command UI module 202 will add the component as a cell to user interface 300. For example, rather than type in the python script to access the flight data, a user may have selected a component with the python script already populated. To generate cells from scratch, in an embodiment, a user may add text to the cell's associated interface (e.g., manually type code, SQL, markdown, python, and so on).

In an embodiment, command UI module 202 may receive a natural language command to automatically generate code. For example, command UI module 202 may receive a command to "obtain public flight data from postgres".

Responsive to receiving such a command, command UI module 202 may pass as input to a supervised machine learning model, such as a generative machine learning model, the command, and may receive as output from the supervised machine learning model a response which command UI module 202 uses to form the code in the cell.

In a notebook structure having many cells that have myriad dependencies, considering state of dependent cells is required to avoid inaccuracies where the cell implicated by the request depends on other cells. Thus, the context of dependent cells is considered in processing commands within a cell. Dependency determination module 204 determines dependencies of the cell, and command UI module 202 may additionally pass the dependencies and/or the cells on which the command cell depends to whatever function is executing the cell.

Figure 4:
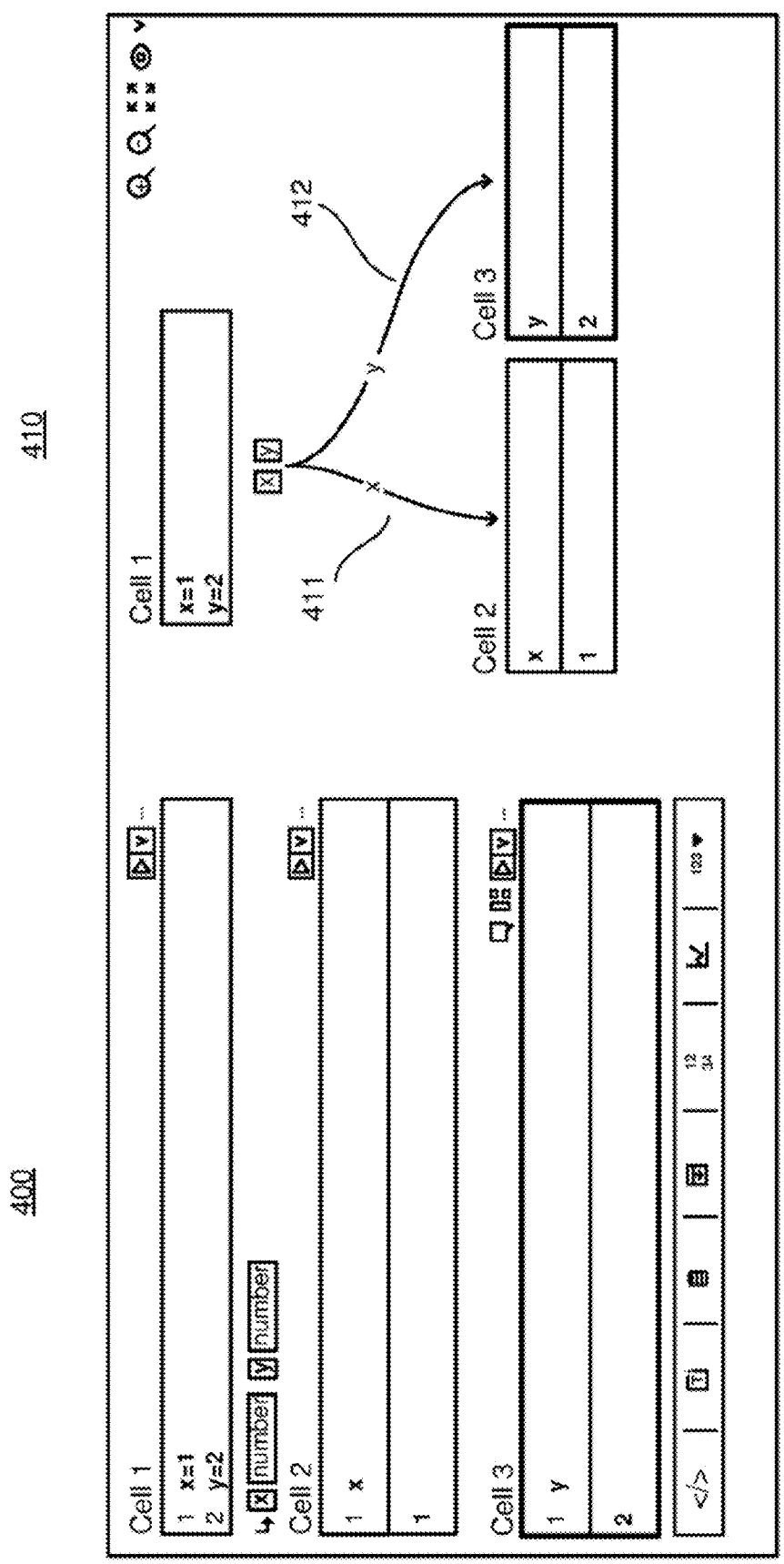
FIG. 4 illustrates exemplary cells and an exemplary graph representing those cells, in accordance with an embodiment.

To illustrate graph dependencies in a DAG used by notebook tool 130, we turn to FIG. 4. FIG. 4 illustrates exemplary cells and an exemplary graph representing those cells. User interface 400 shows cell 1, which defines x=1 and y=2. Cell 2 has a value of x. Cell 3 has a value of y. Notebook tool 130 automatically determines dependencies of cell 2 and cell 3 to cell 1, because the values of variables in those cells are defined in cell 1. Accordingly, shown in graph 410, notebook tool 130 generates directed edge 411 between cell 1 and cell 2, and directed edge 412 between cell 1 to cell 3, the directed edges each pointing downward because the dependency flow goes downward from cell 1. That is, whenever cell 1 has a value that changes in x or y, the corresponding directed edge causes notebook tool 130 to responsively go to cells 2 and/or 3 (depending on which of x, y, or both is updated) to update those values.

In order to successfully implement a DAG structure in a notebook environment, all directed edges between cells must flow in only one direction (to prevent an infinite loop). For example, a DAG is broken in a scenario where a notebook has a first cell that defines a=1 and b=a+1, and a next cell that defines b=1, and a=b+1, because the cells are interdependent. To avoid an infinite loop in such a scenario, notebook tool 130 employs linear ordering, where whichever cell is introduced first in the notebook controls, and the next cell in the infinite loop is dependent on the prior cell. Thus, in the prior example, a directed edge would be drawn from the first cell to the next cell, and no directed edge would be drawn back to the first cell from the next cell.

In order to successfully implement a DAG structure in a notebook environment, the ordering must be deterministic. For example, consider a scenario where there are two cells that each define a variable X. The first cell defines X=1, and the second cell defines X=2. A function of print (X) appears in a third cell. For the DAG to be successfully implemented such that what is printed from the print (X) function is reliable and repeatable, linear ordering is once again used between cells calling a same variable. Thus, in this example, notebook tool 130 would draw a directed edge from X=1 to X=2 to print (X), and the print (X) example would reliably use the value of 2 for X.

With a DAG structure established for a notebook, when a cell is run, dependency determination module 204 may determine, using directed edges of the graph structure, a set of precedent cells from which the code cell depends. That is, as a default, before or in connection with running the cell, dependency determination module 204 may traverse directed edges of the graph structure. The traversal may result in one or more of running each precedent cell that is connected to the cell to be run by a directed edge and/or returning an identification of each precedent cell. Where each precedent cell is run, values for cells (e.g., values of variables within cells, values determined by functions within cells, and so on) may be written to context datastore 250. Further detail about use of context datastore 250 is described in further detail below with respect to context module 206.

In an embodiment, running dependency determination module 204 may occur as a default when a cell is run. Dependency determination module 204 may, optionally, additionally run stale cells relating to the cell when the cell is run. The term "stale", as used herein, refers to a state of a given cell any of the following is true: (1) the cell has not yet been run in a current kernel session; (2) an upstream cell has been edited but the given cell not been re-run; (3) an upstream cell has been run more recently than the given cell itself; and (4) an upstream cell has become stale. For example, returning to the example of cell 1, which defines x=1 and y=2, cell 2 having a value of x, and cell 3 having a value of y, if cell 1 was run more recently than cells 2 or 3, cells 2 and 3 are stale. Stale upstream ancestor cells (that is, cells that are pointed to by a directed edge from a more recently run cell) may be re-run along with precedent cells from which a code cell depends.

Figure 5:
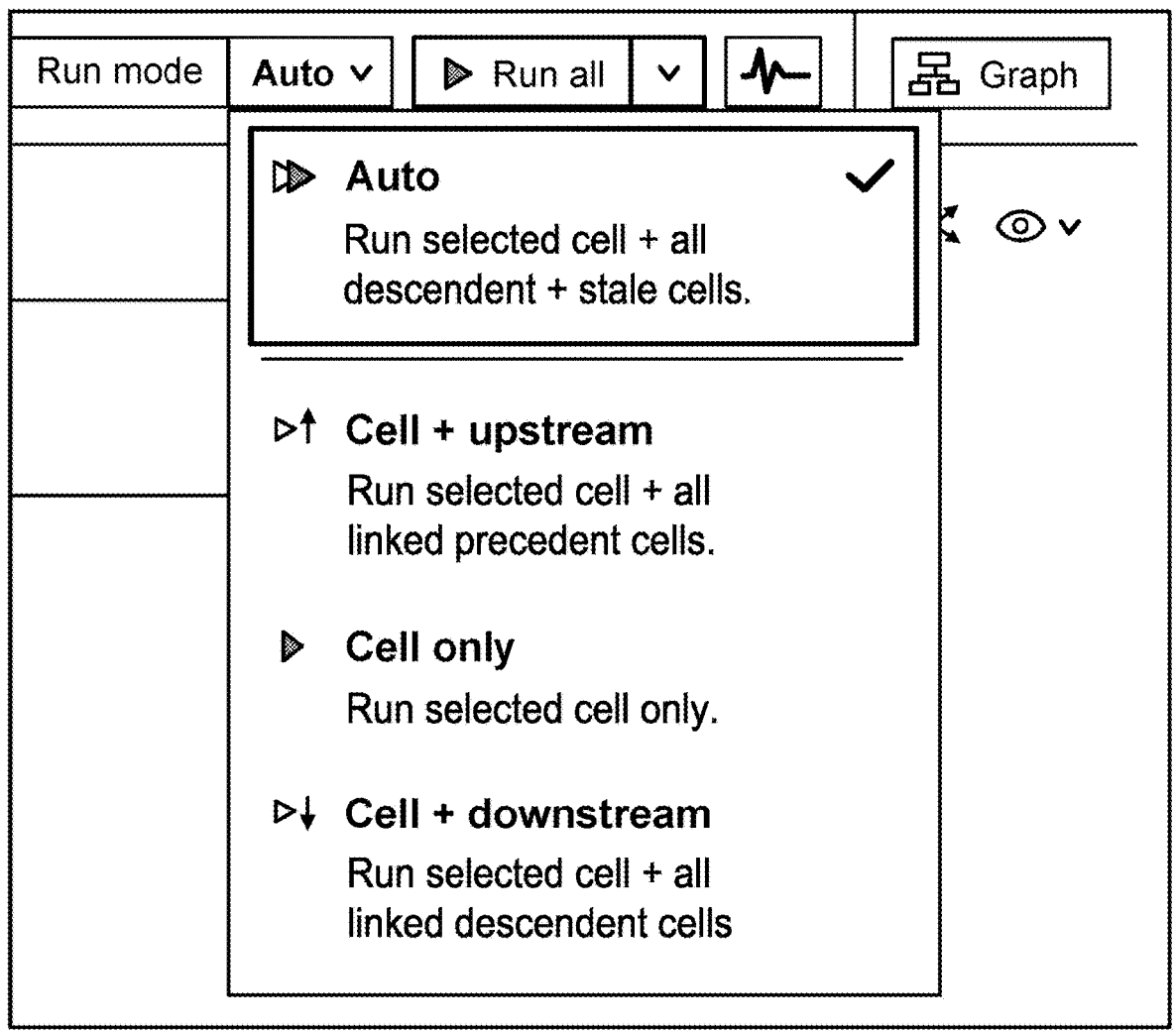
FIG. 5 illustrates an exemplary user interface for customizing which cells are run in connection with running a cell, in accordance with an embodiment.

Turning for the moment to FIG. 5, FIG. 5 illustrates an exemplary user interface for customizing which cells are run in connection with running a given cell. As depicted in user interface 500, a default may be set as described, where when a selected cell is run, its descendent cells and respective stale cells are run. Other options, however, are available. Application 111 may enable a user to select running a selected cell and its linked precedent cells, just the cell itself, or the cell and its linked descendent cells, at the user's option. A selected option may be incorporated by application 111 as a new default operation for a given cell or for all cells until a new default is selected by a user. These selections may be applied whether in local mode or in query mode.

Figure 6:
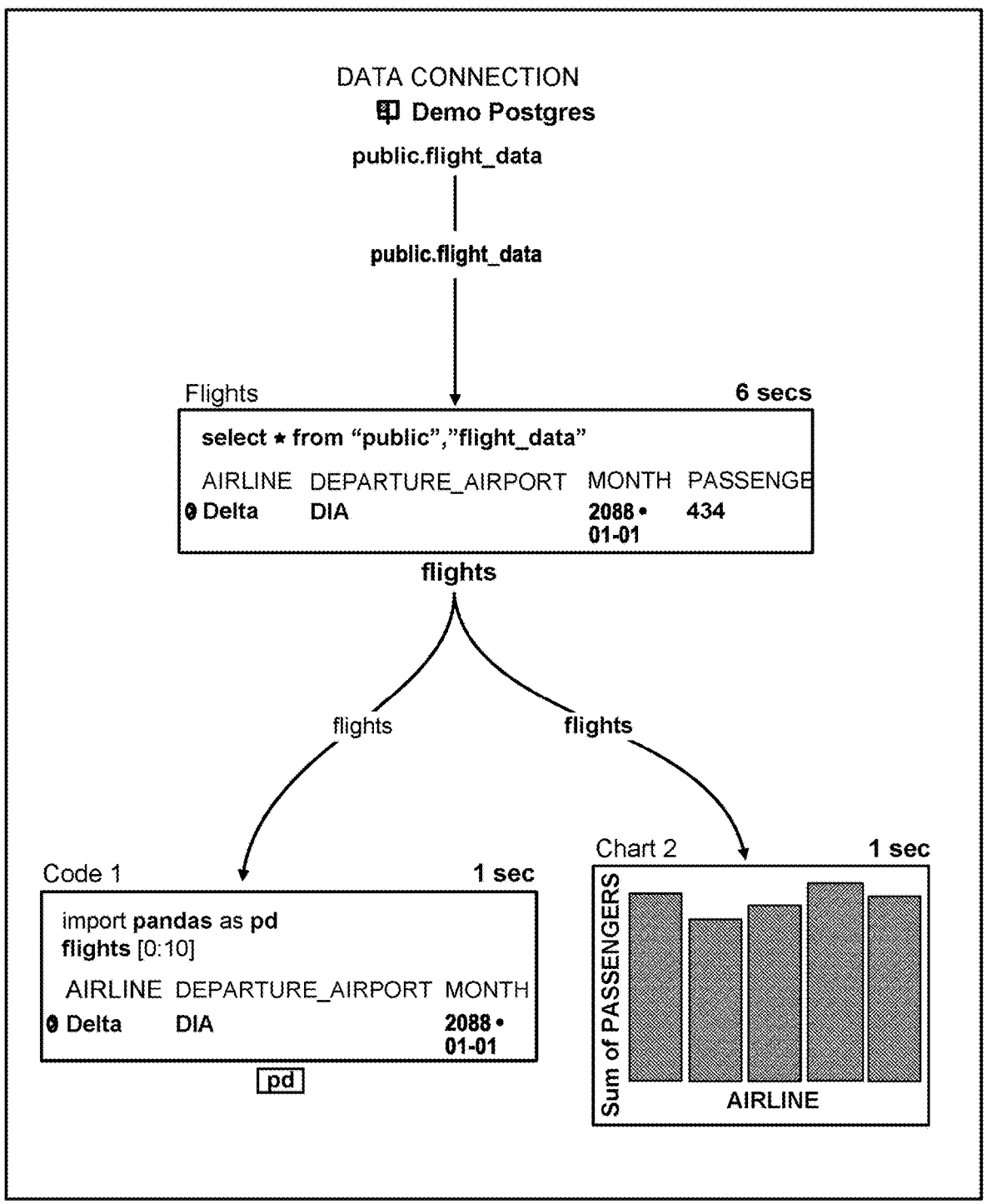
FIG. 6 illustrates a data structure showing context information from a kernel for input into downstream functions, in accordance with an embodiment.

Context module 206 keeps track of data stored (contextual schema) in the kernel. The data stored in the kernel may reflect variable values, cell values, cell states (e.g., stale/not stale), cell dependencies, and so on. Context module 206 may also keep track of data frames (e.g., tables) and sub-components therein (e.g., values of data sets within a data frame). An example of context is shown in FIG. 6, where FIG. 6 illustrates a data structure showing context information from a kernel for input into downstream functions. Graph 600 shows a dependency graph, where a top-level cell retrieves data from postgres and populates a dataframe of flight_data. The next cell down depends on the top-level cell that is selecting public data from the flight data. Two cells branch from there, the left importing from the selected data the first ten rows into a data schema of pandas. Through this process of constructing and running cells in the graph, context module 206 maintains a cache of metadata describing each cell including values associated with each given cell. Therefore, when a lower-level cell is run, it is not necessary to re-run higher-level cells, as context module 206 may instead determine that the higher-level cells are not stale and may return values from those higher-level cells from a prior run that is stored in the cache, rather than needing to re-run those cells.

Returning to FIG. 2, while context module 206 enables running cells using notebook tool 130 to be an efficient process, jobs may be encountered that are either suboptimal or impossible to run using limited allocated kernel resources available to notebook application 111. In particular, running cells relating to large data frames in the kernel (e.g., a billion rows) may require more memory than is available to notebook application 111. To this end, a query mode may be operated, run by query mode module 208, to efficiently transfer the load to data warehouses 140 when appropriate to do so, where data warehouses 140 are tuned to efficiently perform the computation that is suboptimal for notebook application 111 to perform.

Figure 7:
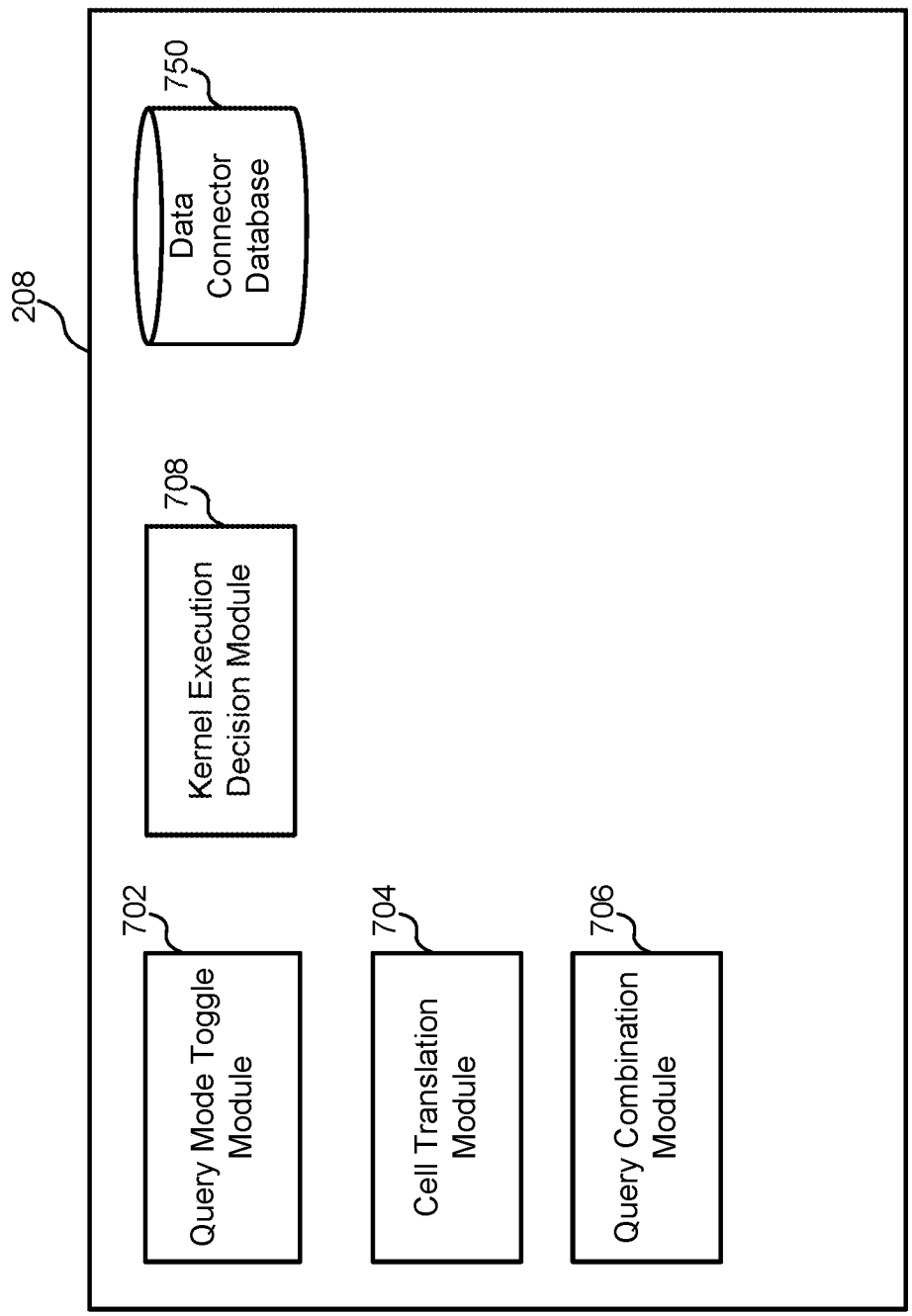
FIG. 7 illustrates one embodiment of sub-modules of a query mode module, in accordance with an embodiment.
Figure 8:
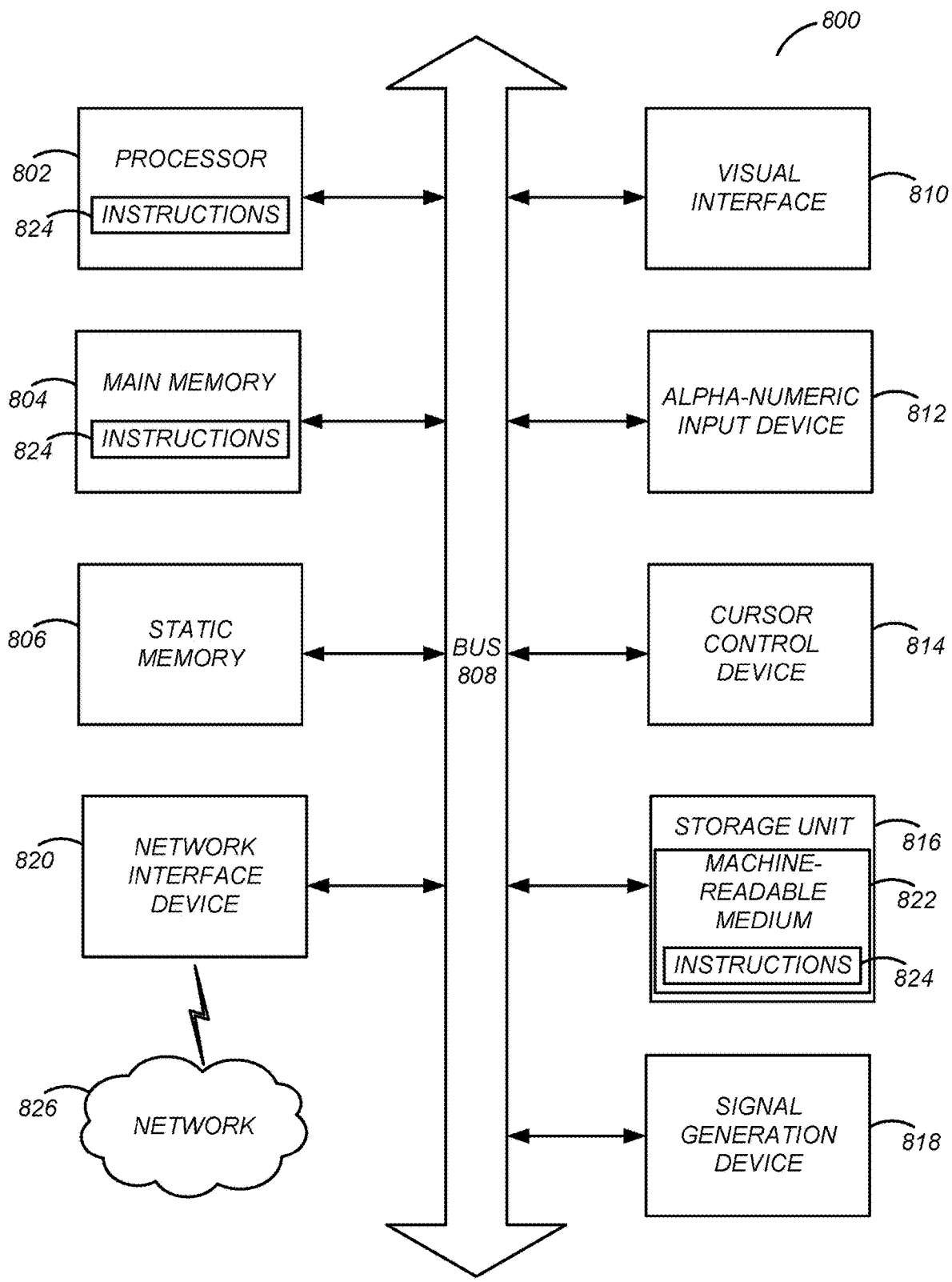
FIG. 8 is a block diagram illustrating components of an example machine able to read instructions from a machine-readable medium and execute them in a processor (or controller), in accordance with an embodiment.

FIG. 7 illustrates one embodiment of sub-modules of a query mode module. As depicted, query mode module 208 includes query mode toggle module 702, cell translation module 704, query combination module 706, kernel execution decision module 708, and data connector database 750. The sub-modules and databases depicted with respect to FIG. 7 are merely exemplary, and more or fewer modules and/or databases may be used to achieve the functionality disclosed herein.

Query mode toggle module 302 detects a trigger to toggle from a local mode to a query mode. The term local mode, as used herein, may refer to normal operation of notebook application 111 where cells are, by default, run using kernel memory unless it is explicitly specified to run cells using a data warehouse 140. The term query mode, as used herein, may refer to a mode where notebook application 111 dynamically determines as a given cell is requested to be run whether the cell is more efficiently run on the kernel or if the task should be offloaded to a data warehouse 140. The term trigger, as used herein, may refer to a condition on which query mode toggle module 302 is instructed to, when encountered, toggle to or from a query mode.

Query mode toggle module 302 may detect a trigger based on input into a notebook interface relating to a dataframe. In an embodiment, the trigger may be detected based on the input being an express command to enter query mode. For example, notebook application 111 may generate for display a selectable option (e.g., using interface 500) that a user may select to run in query mode. Responsive to detecting the selection of the selectable option, query mode toggle module 302 may detect the trigger, and may toggle into query mode. Similarly, notebook application 111 may generate for display a selectable option to toggle back to local mode and, responsive to detecting selection of that option, query mode toggle module 302 may toggle from query mode to local mode.

In an embodiment, query mode toggle module 302 may detect the trigger automatically. For example, when a cell is requested to be run, query mode toggle module 302 may determine a size of the request and an amount of available memory. Responsive to determining that the amount of available memory is insufficient to perform the size of the request, query mode toggle module 302 may detect the trigger. In an embodiment, the automatic detection may occur when a dataframe cell is run, where the size that is determined is a size of a dataframe (e.g., size can be measured based on storage space required or other metrics, such as amount of rows). In an embodiment, rather than compare to an amount of available memory, query mode toggle module 302 may compare the size to a threshold (e.g., the threshold can be amount of storage space required, number of rows in a data frame, and so on). Where the size exceeds the threshold (e.g., threshold is 1 million rows; amount of rows needed to run cell is compared to 1 million rows, and if greater than 1 million rows, the threshold is exceeded), query mode toggle module 302 may detect the trigger and may automatically toggle from local mode to query mode.

While in query mode, cell translation module 704 receives input of a query into a cell within the notebook interface, the query relating to the dataframe. The query may call a dataframe, or may perform a function on the dataframe (e.g., pivot, filter, etc.). Cell translation module 704 detects the cell and determines to translate the input into a data warehouse query language. The query, as received, may be written in native code of notebook application 111 used to run a process on kernel memory of notebook application 111 (e.g., a python query, a kernel-oriented SQL query, etc.). Data warehouse query language may be query language that is tailored for querying a data warehouse. For example, the cell may already have query language within it, and cell translation module 704 may rewrite that query language for use in a data warehouse (e.g., by chaining SQL queries together from upstream cells). As another example, input into a UI such as a natural language input intended for execution on the kernel may be translated into a SQL query where query mode is active. Cell translation module accesses a data connector for the dataframe from data connector database 750, the data connector having instructions for translating native code into a schema of data warehouse 140 that houses the dataframe.

A major premise of query mode is that, when querying and then fine tuning queries for a dataframe, there is no need to use kernel resources of notebook application 111 to locally load the dataframe or a portion thereof. This is because a user of notebook application 111 is likely to continue fine tuning results until the results are suitable for performing a function, such as generating a graph from a filtered set of data of the dataframe. To this end, rather than load the dataframe at each query, notebook application 111 may instead simply display a preview (e.g., as shown in user interface 300 of FIG. 3). Moreover, because subsequent queries may build on prior queries, query mode may leverage context of prior queries and combine those prior queries into a next query, thus generating a further efficiency in performing the further queries.

Query combination module 706 combines (e.g., chains or otherwise concatenates) queries from upstream cells into a next cell when that cell is generated and run. To illustrate this, imagine the following sequence of cells within a query mode, each cell dependent on its prior cell based on it calling data from the prior cell:

Cell 1: pull flight_data dataframe from Postgres
Cell 2: select all public flights from flight_data
Cell 3: find all flights in the output of cell 2 that have 300 passengers that have at least 300 passengers
Cell 4: based on the output of cell 3, find all flights from the public flights that have between 300 and 500 passengers.
Cell 5: generate a chart representing airlines as charted against total number of passengers based on the flights output by the function of cell 4.

If query mode was not being used, each of these cells would be run independently from the kernel memory, all flights would be downloaded from execution of cell 2, and then cells 3 and 4 would be executed against what was downloaded in memory. Because query mode is being used, the kernel stores prior queries and query code commands that were sent to the relevant data warehouse 140 (e.g., based on activities performed by context module 206). Therefore, when cell 2 is run, flight_data is already known to be accessed using memory of the data warehouse 140 and that there is no need to download flight_data. The accessed data is filtered for public flights within the data warehouse by combining queries in subsequent cells. That is, query combination module 706 combines into the cell 2 query a pointer to what was already pulled from cell 1. This continues, where when cell 3 is run, query combination module 706 translates the code cell into query language for use in the data warehouse using the data connector where the query language references the query from cell 2 along with a filter to at least 300 passengers from cell 3. Moving to cell 4, query combination module 706 translates the code cell into query language for use with the data warehouse using the data connector where the query language references the cell 3 query and applies an additional filter of less than 500 passengers.

Kernel execution decision module 708 determines whether to run a cell using resources of data warehouse 140 or using kernel resources. Kernel execution decision module 708 may perform this determination based on attributes of the cell and/or context information relating to the cell and its dependencies. When performing the decision based on attributes of the cell, kernel execution decision module 708 may determine whether running the cell involves a function satisfying a rule. For example, a rules table may be stored by query mode module 208 (e.g., to context datastore 250) that maps function types to data warehouses, the functions being those that a data warehouse is designed to optimally perform. Exemplary types of functions that data warehouses are typically designed to efficiently perform include pivot and filtering functions on a dataframe, though any function may be mapped for performance by a data warehouse. Responsive to determining that running the cell involves a function that is mapped by such a rules table to the data warehouse acting on the dataframe on which the function applies, kernel execution decision module 708 may determine to run the cell using resources of data warehouse 140. Responsive to determining that the function is not mapped to the data warehouse, kernel execution decision module 708 may determine to run the cell using kernel resources of notebook application 111.

Following from the five-cell example above, cells 1-4 are best performed by using resources of a data warehouse, given that they perform dataframe pull and filter functions (e.g., which may be named by a rules table in association with a postgres data warehouse). Therefore, kernel execution decision module 708 determines to perform query combinations using query combination module 706 when running these cells. However, when running cell 5, kernel execution decision module 708 may determine to generate the chart using kernel resources. In general, generating charts and other user interface data representations from dataframe data is something data warehouses are not optimized to do. Kernel execution decision module 708 may make this determination based on chart generation not being listed on the aforementioned rules table or other data structure that maps the function to the data warehouse. Accordingly, query mode module 208 may run the cell using kernel resources, acting on the manipulated and filtered data frame from cell 4. This results in kernel resources (e.g., running cell 5 in python), which are far more limited and computationally expensive to use than data warehouse resources, only being used where absolutely necessary to perform functionality that a data warehouse is not equipped to perform or is inefficient at performing.

Computing Machine Architecture

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

FIG. 9 is an exemplary flowchart for running cells in a query mode of a notebook tool, in accordance with an embodiment. Process 900 may operate by one or more processors (e.g., processor 802) executing instructions (e.g., instructions 824) stored in memory of a non-transitory computer-readable medium (e.g., main memory 804 and/or machine-readable medium 822) that cause modules and/or sub-modules of notebook tool 130 and/or notebook application 111 to operate. Process 900 begins with notebook tool 130 detecting 902 a trigger to toggle from a local mode to a query mode (e.g., using query mode toggle module 702), the trigger detected based on input into a notebook interface relating to a dataframe. Notebook tool 130 receives 904 input of a query into a cell within the notebook interface (e.g., using command UI module 202), the query relating to the dataframe. Notebook tool 130 determines 906, based on having entered the query mode, to combine the query with a prior query from a prior cell within the notebook interface, resulting in generation of a combined query (e.g., using dependency determination module 204 in combination with query combination module 706).

Notebook tool 130 executes 908 the combined query with respect to a data warehouse (e.g., based on feedback from kernel execution decision module 708). Notebook tool 130 receives 910 a command to perform a function with respect to the combined query (e.g., the function being one optimally performed by using kernel memory resources, as determined by kernel execution decision module 708), and notebook tool 130 determines 912, based on characteristics of the command, to execute the command using memory of the notebook interface. Notebook tool 130 outputs 914, using the notebook interface, a graphical representation of results of the command, the results informed by the combined query (e.g., using command UI module 202).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating code for cells having dependencies shown in a DAG using generative AI through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, using a notebook application, input of a query into a cell within a notebook interface, the query relating to a dataframe;
   determining, using the notebook application, to combine the query with a prior query from a prior cell within the notebook interface, resulting in generation of a combined query, the combined query pointing to data of the dataframe already accessed using resources of a data warehouse when performing the prior query;
   instructing, by the notebook application, the data warehouse to perform the combined query;
   receiving, by the notebook application, a command to perform a function with respect to the combined query;
   determining, by the notebook application, based on characteristics of the command, to execute the command using memory of the notebook interface rather than the resources of the data warehouse; and
   outputting, using the notebook interface, a graphical representation of results of the command, the results informed by the combined query.

2. The method of claim 1, wherein determining to combine the query with the prior query is based on detection of a selection, from a user, of an option within the notebook interface to toggle to a query mode.

3. The method of claim 1, wherein the query is with respect to a dataframe, and wherein determining to combine the query with the prior query is based on a size of an operation to be performed with respect to the dataframe as indicated in the query.

4. The method of claim 3, wherein determining to combine the query with the prior query is further based on an available memory being insufficient to handle the size of the operation.

5. The method of claim 1, wherein the generation of the combined query comprises re-running one or more cells from which the prior cell depends responsive to determining that the one or more cells have a stale state.

6. The method of claim 1, wherein generation of the combined query comprises referencing a cached result, from the memory of the notebook interface, of the prior query responsive to detecting a current state of the prior cell.

7. The method of claim 1, wherein the command is executed using python.

8. A non-transitory computer-readable medium comprising memory with instructions encoded thereon, the instructions, when executed by one or more processors, causing the one or more processors to perform operations, the instructions comprising instructions to:
receive, using a notebook application, input of a query into a cell within a notebook interface, the query relating to a dataframe;
determine, using the notebook application, to combine the query with a prior query from a prior cell within the notebook interface, resulting in generation of a combined query, the combined query pointing to data of the dataframe already accessed using resources of a data warehouse when performing the prior query;
instruct, by the notebook application, the data warehouse to perform the combined query;
receive, by the notebook application, a command to perform a function with respect to the combined query;
determine, by the notebook application, based on characteristics of the command, to execute the command using memory of the notebook interface rather than the resources of the data warehouse; and
output, using the notebook interface, a graphical representation of results of the command, the results informed by the combined query.

9. The non-transitory computer-readable medium of claim 8, wherein determining to combine the query with the prior query is based on detection of a selection, from a user, of an option within the notebook interface to toggle to a query mode.

10. The non-transitory computer-readable medium of claim 8, wherein the query is with respect to a dataframe, and wherein determining to combine the query with the prior query is based on a size of an operation to be performed with respect to the dataframe as indicated in the query.

11. The non-transitory computer-readable medium of claim 10, wherein determining to combine the query with the prior query is further based on an available memory being insufficient to handle the size of the operation.

12. The non-transitory computer-readable medium of claim 8, wherein the generation of the combined query comprises re-running one or more cells from which the prior cell depends responsive to determining that the one or more cells have a stale state.

13. The non-transitory computer-readable medium of claim 8, wherein generation of the combined query comprises referencing a cached result, from the memory of the notebook interface, of the prior query responsive to detecting a current state of the prior cell.

14. The non-transitory computer-readable medium of claim 8, wherein the command is executed using python.

15. A system comprising:
memory with instructions encoded thereon; and
one or more processors that, when executing the instructions, are caused to perform operations comprising:
receiving, using a notebook application, input of a query into a cell within a notebook interface, the query relating to a dataframe;
determining, using the notebook application, to combine the query with a prior query from a prior cell within the notebook interface, resulting in generation of a combined query, the combined query pointing to data of the dataframe already accessed using resources of a data warehouse when performing the prior query;
instructing, by the notebook application, the data warehouse to perform the combined query;
receiving, by the notebook application, a command to perform a function with respect to the combined query;
determining, by the notebook application, based on characteristics of the command, to execute the command using memory of the notebook interface rather than the resources of the data warehouse; and
outputting, using the notebook interface, a graphical representation of results of the command, the results informed by the combined query.

16. The system of claim 15, wherein determining to combine the query with the prior query is based on detection of a selection, from a user, of an option within the notebook interface to toggle to a query mode.

17. The system of claim 15, wherein the query is with respect to a dataframe, and wherein determining to combine the query with the prior query is based on a size of an operation to be performed with respect to the dataframe as indicated in the query.

18. The system of claim 17, wherein determining to combine the query with the prior query is further based on an available memory being insufficient to handle the size of the operation.

19. The system of claim 15, wherein the generation of the combined query comprises re-running one or more cells from which the prior cell depends responsive to determining that the one or more cells have a stale state.

20. The system of claim 15, wherein generation of the combined query comprises referencing a cached result, from the memory of the notebook interface, of the prior query responsive to detecting a current state of the prior cell.

* * * * *